United States Patent
Schmit et al.

[11] Patent Number: 6,050,330
[45] Date of Patent: Apr. 18, 2000

[54] METAL TANK

[75] Inventors: Francis Schmit, Ansacq; Michel Sanadres, Pont Sainte Maxence, both of France

[73] Assignee: Sollac, Puteaux, France

[21] Appl. No.: 09/147,306

[22] PCT Filed: May 23, 1997

[86] PCT No.: PCT/FR97/00901

§ 371 Date: Jan. 20, 1999

§ 102(e) Date: Jan. 20, 1999

[87] PCT Pub. No.: WO97/45217

PCT Pub. Date: Dec. 4, 1997

[30] Foreign Application Priority Data

May 24, 1997 [FR] France .................................. 96 06439

[51] Int. Cl.[7] ............................. B21D 51/18; B65D 25/14
[52] U.S. Cl. .................. 165/133; 165/170; 29/890.039; 29/463; 29/458; 156/292; 156/306.6
[58] Field of Search ..................... 165/133, 170; 156/292, 306.6; 29/890.039, 458, 463

[56] References Cited

U.S. PATENT DOCUMENTS

| | | | |
|---|---|---|---|
| 3,840,423 | 10/1974 | Bemrose et al. | 156/583 |
| 4,048,005 | 9/1977 | Nakagome et al. | 156/630 |
| 4,947,548 | 8/1990 | Bentley | 29/890.039 |
| 5,271,151 | 12/1993 | Wallis | 29/890.053 |

*Primary Examiner*—Allen Flanigan
*Attorney, Agent, or Firm*—Oblon, Spivak, McClelland, Maier & Neustadt, P.C.

[57] ABSTRACT

The invention discloses the manufacture of a metal tank comprising the following steps: coating a strip of sheet steel with a thermally adhesive polymer based layer, preparing segments provided with assembly zones from the blanks of the said coated sheet, assembling the said segments at the assembly zones, consolidating the assembly by cold mechanical assembling means and heating to activate bonding of the polymer layers in contact at the assembly zones. The invention is useful in particular for manufacturing fuel tanks and heat exchangers.

16 Claims, 2 Drawing Sheets

METAL TANK

The invention concerns the making of metal tanks intended to contain at least one fluid and capable of resisting pressure, even of gas, as for example automobile fuel tanks, heating radiators for buildings or refrigerator evaporators or condensers.

To make such tanks from sheet metal blanks, said blanks are put into the form of shells having a shape adapted to the tank to be made, then said shells are assembled to form the tank.

The assembly is generally achieved by welding in the region of assembling zones or flanges in order to ensure both liquid-tightness and resistance to pressure.

In the case where the tank is intended to contain corrosive liquids, in particular in the case of fuel tanks, steel sheets are currently used which are coated with a coating for protection against internal corrosion.

The U.S. Pat. No. 4,824,736 (exactly corresponding to WO-89 02855) describes in particular a sheet steel tank coated internally with a protective coating of polypropylene modified with maleic anhydride.

The protective polymer coating maintains a very strong adherence to the sheet during and after the shaping of the shells.

But the presence on the sheet of a protective polymer coating may be troublesome for the shell welding operation: indeed, the thermal effects of the welding often produce a deterioration of the polymer coating in the vicinity of the shell-welding bead, and the internal zone of the weld bead is no longer effectively protected against corrosion.

In the case where the sheet is provided with a coating providing protection against external corrosion, the deterioration of the external coating, also consecutive to the welding operation, requires "repairing" the protective coating in the welding zone, for example by application of an external protective coating in this zone after welding.

To avoid the drawback relating to the nature of the sheet protecting coatings, one could be tempted to effect the welding of the shells under conditions adapted to limit the heating of the polymer coating to a simple melting.

Apart from the drawback of requiring a very strict control of the welding conditions, such an assembling process still leaves the welding bead itself without protection against corrosion.

The document U.S. Pat. No. 4,131,980 describes a process for making a metal tank, in which:

shells are put into shape from metal sheets which are not provided with a polymer coating, the assembling flange of one of the two metal shells to be assembled is provided with a polymer coating (reference 36 in FIG. 2 of the document), the two flanges are seamed one around the other (FIGS. 3 to 7 of the document).

The polymer coating applied then acts as an adhesive joint between the flanges folded for seaming.

The two assembling means, the mechanical seaming means and the chemical bonding means, collaborate.

As concerns the bonding, the use of epoxy vinyl, polyester, polyurethane, polysulphide resin is described.

This process has several drawbacks:

the use of this type of resin as the bonding means poses problems of internal corrosion in that the adhesive joint is liable to be deteriorated by the fuel this process requires an operation for applying glue on the assembling flanges after the shells have been put into shape;

with reference to FIG. 3B which represents, in section, the junction between two shells 4' and 5' with the glue joint 6', it was found that the zone termed the triple point zone designated by the reference 7B, which corresponds to the limit of the adhesive joint 6' in contact with the two sheets 4' and 5', formed a mechanically weakening line or a rupture initiation line and that it is in this region that the risk of rupture of the tank was the highest.

The invention also concerns the making of metal heat exchanger tanks intended in particular for making evaporators and condensers of refrigerating machines.

The following description concerns more particularly evaporators of the "roll bond" (in the English language) type, but the same process may be employed for making any heat exchanger (for example: heating radiator or solar panel, condenser) employing one or more cooling or heat transfer fluids.

To make evaporators of the "roll bond" (in the English language) type:

usually two sheets of aluminium alloy are taken, one of the sheets is locally provided with a coating of an anti-diffusion product on a zone outlining the circuit intended for the cooling fluid in the evaporator, the second sheet is applied on the partly-coated surface of the first sheet and the two assembled sheets are hot rolled to produce locally a welding by diffusion between these two sheets, outside the zone provided with the anti-diffusion product between these two sheets, a fluid under pressure is then introduced in the non-welded zone between the two assembled sheets so as to form ribs by expansion of the sheets in this zone.

There is thus obtained an evaporator tank panel formed of two strongly assembled ribbed sheets which are therefore fluid-tight and resist the pressure of gas, the ribs of which form the cooling fluid circuit in the evaporator.

The process termed "roll bond" (in the English language) permits making exchangers in the form of a panel having a large thermal exchange surface; these "flat" exchangers are also easy to clean, which presents advantages from the hygienic point of view.

Such a process is, for example, described in the document EP 703 427.

This process has several drawbacks:

the operations for welding and shaping by application of a fluid under pressure are costly.

it requires the use of a material which is weldable by diffusion and is sufficiently ductile to be easily formable under pressure of a fluid; this is why aluminium is generally used, which is an expensive material.

it imposes constraints as concerns the definition of the fluid circuits, the forming by blowing being liable to produce ruptures in particular in the curved parts of the circuit.

An object of the invention is to provide an economical tank formed of a plurality of assembled metal shells which have a better resistance to pressure, are protected internally against corrosion by a polymer coating, including in the region of the shell assembling zones.

The invention is applicable in particular to the making of fuel tanks and heat exchangers, in particular evaporators and condensers of refrigerating machines or heating radiators.

For this purpose, the invention provides a process for making a sheet steel tank intended to contain a fluid, resisting pressure of a gas, characterized in that it comprises the steps consisting in:

coating a strip of said sheet with a thermobonding polymer based coating adapted to adhere to said sheet and resist corrosion of said fluid, then cutting out blanks in said coated strip and putting into shape shells in accordance with the shape required for said tank, provided with assembling zones, in particular assembling flanges, intended to be put into contact upon assembly, said shells being prepared in such a manner that the coated face of the sheet is situated inside the tank, then assembling said shells in such a manner as to put them in contact under pressure in the region of the assembling zones, reinforcing the assembly by cold mechanical assembling means applied in the region of said assembling zones, such as seaming or clinching, and heating said polymer coatings in contact in the region of the assembling zones, at a temperature adapted to activate the bonding and form a tight bonded joint.

The invention may also have one or more of the following characteristics:

said polymer based coating has a thickness of between 20 and 150 micrometers.

said sheet of steel is coated with a metallic coating, in particular of zinc, aluminium, zinc alloy, or aluminium alloy and/or a coating of paint.

The invention also provides a process for making a tank intended to contain automobile fuel, characterized in that:

the polymer of said coating is semi-crystalline thermoplastic, the heating of said polymer coatings in contact in the region of the assembling zones is effected at a temperature higher than the melting temperature of said polymer.

The invention may also have one or more of the following characteristics:

said semi-crystalline thermoplastic polymer is based on polyolefine, in particular polyethylene or polypropylene said semi-crystalline thermoplastic polymer has a crystallinity ratio higher than 60% and a solubility parameter close to that of said fuel.

The invention also provides a process for making a tank intended to act as a heat exchanger and to contain a cooling or heat-transfer fluid, characterized in that the shaping of the shells in the shape required for said heat-exchanger comprises the formation of ribs adapted to constitute after assembly, tight ducts for the circulation of said fluid in said exchanger.

The invention finally provides a tank intended to act as a heat-exchanger, characterized in that it comprises a plurality of independent thermal fluid circulation circuits.

The invention will be better understood from a reading of the following description, which is given as a non-limitative example, with reference to the accompanying Figures, in which.

Figure 1:
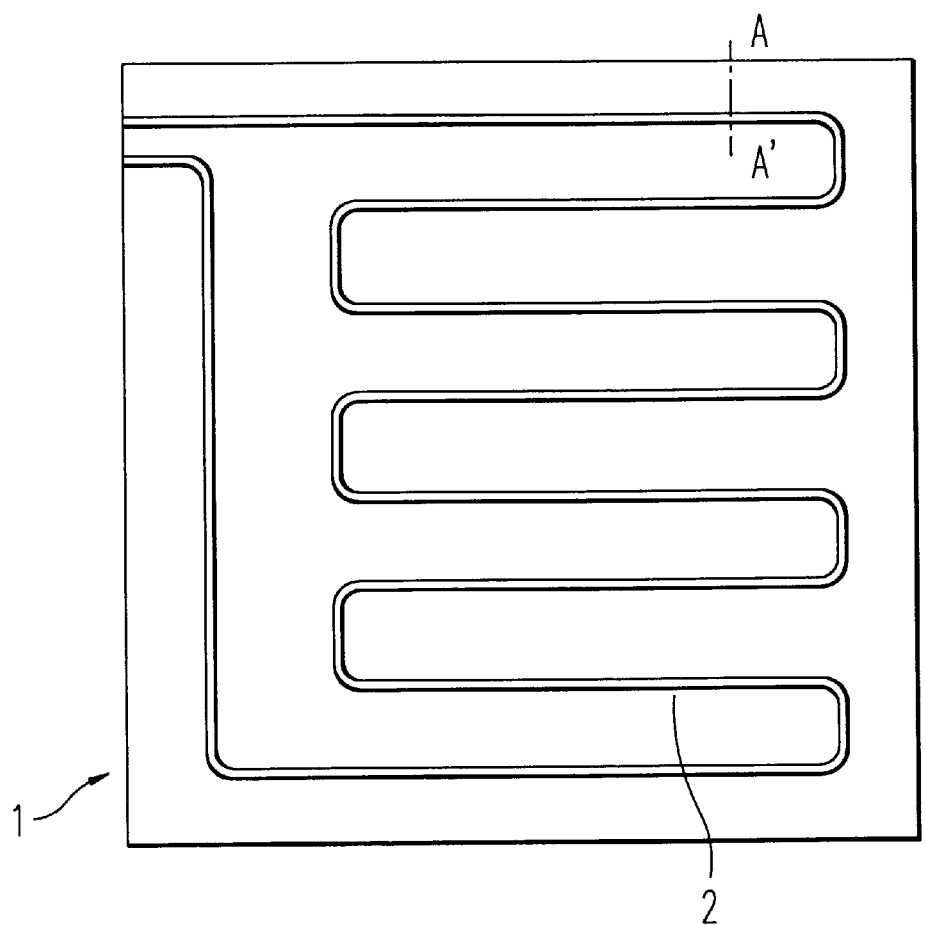
FIG. 1 represents, viewed from above, an evaporator tank panel according to the invention
Figure 2:
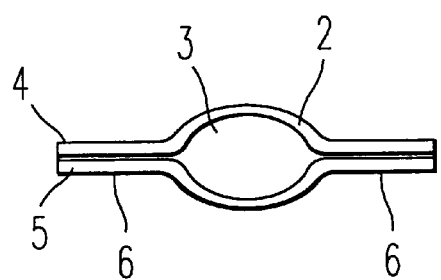
FIG. 2 represents in section along AA' a part of the evaporator of FIG. 1.

The installation for making a tank comprises means for coating a strip of steel with a polymer coating, means for cutting out sheet blanks from the sheet strip, means for shaping the sheet blanks, means for the cold mechanical assembling, as for example, seaming or clinching means, and means for heating to a temperature adapted to activate the bonding of the polymer coatings in contact.

These means are known per se and will not be described here in detail.

The process for making the metal tank from a sheet strip will now be described.

The sheet strip may be already precoated with a metallic coating for protection against corrosion, such as a coating of zinc, aluminium, zinc or aluminium alloys.

This prior coating is in particular useful for protecting the exterior surface of the tank against corrosion.

Again, as concerns the exterior of the tank, this steel strip may even be precoated with a coating of paint (termed "prelacquered" steel) on the face intended to subsequently form the external surface of the tank.

With the aid of coating means, there is applied, preferably continuously, on the face of the steel strip intended to form subsequently the internal surface of the tank, a thermobonding polymer based coating.

This thermobonding polymer may be for example a semi-crystalline thermoplastic polymer.

This thermobonding polymer may be a thermosetting composition the cross-linking of which is thermally activatable.

This thermobonding polymer based coating may contain colouring agents, pigments, plasticizers and other additives conventional in the field of varnishes or paints.

The method of application is known per se and will not be described here in detail; it may involve the use of solvents or a drying or evaporation operation, To ensure a good adherence of the polymer coating on the sheet, before application, the surface of the sheet is preferably treated by for example degreasing it and applying a chemical conversion solution such as a chromating or phosphatizing solution, Preferably, the thickness of the polymer coating applied is between 20 and 150 $\mu m$ so as to be able to form, after the bonding opperation subsequently described, a continuous adhesive joint which is therefore tight and strong.

To impart to the steel sheet good resistance to corrosion by the fluid of the tank, the applied polymer must be both insoluble or very little soluble in this fluid and stongly adhere to the steel sheet.

To ensure a good adherence of the polymer coating to the sheet, there is preferably chosen a polymer modified by grafting or copolymerization with polar compounds, preferably selected from acrylic, vinyl, acetate, maleic anhydride and acrylic esters.

In the case of automobile fuel tanks, there is used as the polymer, a semi-crystalline thermoplastic polymer, preferably a polyolefine, in particular a polyethylene or polypropylene.

To limit the sensitivity of the polymer to fuels, it is consequently preferable that the applied polymer have a crystallinity ratio higher than 60% and a solubility parameter close to that of the fuel to be contained (for example about 8 $(cal/cm^3)^{0.5}$ for petrol).

In the case of a heat exchanger tank, there may usually be used thermoplastic polymers, such as a mixture of polyethylene and polyamide, or thermosetting compositions such as prepolymers of epoxy resin which are simple or modified to improve the tenacity.

To avoid any degradation or cracking when shaping or even assembling, a polymer having a vitreous transition temperature lower than about 10° C. is preferably chosen.

After coating the sheet strip with a coating of polymer, it is arranged to make the tank in several segments or shells.

For example, for a fuel tank having complex shapes, the tank is segmented into shells which have a press-formable shape and have assembling flanges applicable against one another for assembling the tank.

When the tank to be made is a heating radiator, conventionally, it is also arranged to make the radiator in a plurality of segments to be assembled; these segments also have assembling zones which are applicable against one another, in particular in the region of the flanges.

When the tank to be made is a heat exchanger 1 of a refrigerating machine (evaporator or condenser) such as that shown in FIG. 1 having a duct 3 for the circulation of the cooling fluid, it is arranged to make the exchanger from two elements, here sheets 4,5 ribbed for example by a press-forming operation; the ribs 2 of these sheets are adapted to form said duct and the planar non-ribbed surfaces of the sheets are adapted to form the assembling zones of the to sheets 4,5.

There are therefore provided on the shells or elements of the tank, on the face coated with polymer, assembling zones, in particular on the flanges, applicable against one another when assembling.

The area of these zones is adapted to the chosen cold mecanical assembling mode; for example for the seaming of the flanges, rather wide flanges should be provided which will be subsequently folded.

The area of these zones is also adapted to the stiffness and the resistance to pressure required of the tank.

In the case of heat exchangers such as that shown in FIG. 1, the position of the assembling zones defines the thermal fluid circuit or circuits and the large area of the assembling zones permits obtaining a very high resistance to pressure, for example up to 40 $10^5$ Pa.

With the aid of cutting means, the sheet blanks are then cut out in the strip coated with polymer; then, in starting with these blanks and with the aid of shaping means, the tank shells or elements are prepared in the manner known per se, which permits, among other things, locating the assembling zones and, in the case of heat exchangers, the thermal fluid circuit or circuits.

For these operations, care is taken to maintain the polymer based coating on the side forming the internal surface of the tank.

Depending on the shape of the tank shells or elements, it is possible to employ shaping methods other than press forming, in particular folding.

The different shells or elements are then assembled to constitute the tank by applying the assembling zones against one another and, in the case of assembling flanges, flange against flange.

In the region of the interface between the assembling zones of the adjacent shells or elements, there are therefore two polymer based coatings which come into contact on the surface of the assembling zone.

With the aid of cold mechanical assembling means, the shells or elements are interconnected, for example by seaming or clinching in the assembling zones and/or flanges.

Then, while the shells or elements are already partly interconnected and maintained by the contact pressure in these zones, the sheet is heated with the aid of heating means in these assembling zones so as to activate the bonding (or thermobonding) of the two coatings of polymer in contact in these zones.

The heating means may for example employ infrared radiation, magnetic induction or conduction.

If a thermoplastic polymer is used, the heating means are adapted to bring the surface of the contacting polymer coatings to a temperature, on one hand higher than the melting temperature of the polymer and on the other hand distinctly lower than the degradation temperature of the polymer or other prior coating or prior lacquering of the sheet.

A tank which is fluid-tight and very resistant to pressure is obtained.

The polymer coating then performs the double function of internal protection against corrosion by the contained fluids and a tight and strong joint between the shells or elements forming the tank.

As the polymer coating may be continuously applied on the strips, it can be distributed in an improved manner over the sheet to better ensure this double function.

According to the invention, the inner surface of the tank remains totally protected against corrosion, even in the region of the assembling zones.

Figure 3A:
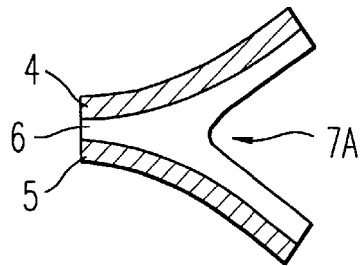
FIGS. 3A and 3B are diagrammatic sectional representations of the adhesive joint between two tank shells, respectively according to the invention and according to the prior art.
Figure 3B:
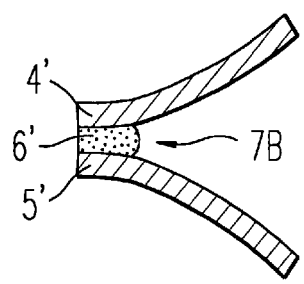

As the polymer coating is continuous inside the tank, there is no longer any mechanically weakening line 7B as in the document U.S. Pat. No. 4,131,980 previously cited with reference to FIG. 3B; indeed, the junction zone 7A of the shells or elements of the tank are then as shown in FIG. 3A, with no rupture-initiating line and the tank according to the invention resists higher pressures.

Owing to the interconnection by the cold mechanical assembling means prior to the heating for achieving the bond, the adhesive joint is formed under perfectly static conditions, which improves its resistance.

Owing to the high adherence of the polymer to the sheet, the adhesive joint effectively contributes to the interconnection of the shells.

The bonding and the mechanical assembling in the assembling zones consequently affords a very strong joint between the shells and a very high stiffness of the tank.

Depending on the desired resistance, there is adapted in the manner known per se the type of clinching or the number of clinching points in the assembling zones. The tank is tight in the region of the assembling flanges in particular owing to the adhesive joint formed by the polymer based coating and resists pressure owing to the very strong joint between the shells.

In the case of heat exchangers subjected to very high pressures, for example in the case of refigerator evaporators or condensers, the adhesive joints in the assembling zones provide a tight insolation between the elements of the thermal fluid circuit or circuits and afford a high resistance to pressure.

Such a "mixed" assembling process (bonding+cold mechanical assembling) allows high production rates since the part can be handled during and above all immediately after the bonding heating.

Further, the bonding is here achieved with no substance added to the sheet after shaping (no application of adhesive), which considerably simplifies the production (no handling of products, no risks related to solvents).

In the case of heat exchangers, in particular refrigerators, the process according to the invention is much more economical than the processes of the prior art, in particular the process termed "roll bond" in the English language.

The definition of the fluid circuits by forming ribs prior to the assembly permits, contrary to the process employing fluid expansion applied after assembly, forming with precision complex circuits with no risk of rupture.

Another advantage of this process is that is permits economically making heat exchangers having a plurality of independent thermal fluid circulation circuits.

In the case of for example fuel tanks, another advantage of this process is that it is easy to obtain tanks having flanges which are much narrower than in the case of assembling by welding, while retaining a comparable resistance to pressure; for example, the flanges of tanks according to the invention would extend 5 to 10 mm outwardly beyond the body of the tank in the case of seaming, about 10 to 20 mm in the case of clinching, but more than 20 mm for the welded tanks of the prior art.

Thus, for a given capacity, the outside dimensions may be reduced (the flanges projecting much less than in the case of welded tanks), which is particularly advantageous in the case of automobile tanks.

Another advantage of this process is to permit the assembly of shells whose flanges define contours of small radius of curvature (contrary to welding), which permits making tanks of complex shape.

A metal tank was thus made for fluids which is capable of resisting pressure and completely protected against internal corrosion by a polymer based coating including in the region of the assembling joints.

Further, in the case where the sheet used is precoated with a metallic coating or prelacquered, for reasons of external appearance of the tank or resistance to external corrosion, the precoating or the prelacquering is not deteriorated by the tank-making operations.

Without departing from the present invention, the application of the polymer coating on the sheet is effected continuously on an industrial sheet-production site and the products delivered from this site for making tanks are then strips of sheet which are "precoated with adhesive" on one face and may also be prelacquered on the other face.

Advantageously, the manufacturer of the tanks has no welding to effect nor any adhesive or solvent to handle.

The following examples illustrate the invention.

EXAMPLE 1

The purpose of this example is to illustrate the first step of making a tank according to invention, namely the preparation of a strip of sheet prepainted on one face and coated on the other face with an adhesive polymer film, by means of a continuous lacquering installation and a rolling installation.

The sheet used is of galvanized steel (about 150 g/m$^2$ of zinc based precoating) about 0.7 mm thick.

The polymer film of the coating is based on an ethylene-acrylic acid ("EAA") copolymer having 11% acrylic acid; the melt index measured in accordance with the ASTM D 1238 standard is 8 g per 10 min; its density measured in accordance with the ASTM D 1505 standard is 940 kg/m$^3$; its melting temperature measured in accordance with the ASTM E 794 standard is 94° C.

This coating film is made by extrusion-blowing and has a thickness of 100 $\mu$m.

To make the prepainted and coated strip of sheet, the sheet is degreased in an alkaline bath, a chromating treatment is applied which comprises a chromic rinsing, a paint is applied on the face to be painted in the lacquering installation and then the polymer coating film is rolled onto the other face by means of the rolling installation at the approximate rate of 60 m/min and at a temperature of about 200° C.

The tensile-shear and peeling tests then carried out on the film applied on the sheet reveal a very good adherence of the film to the sheet, even after 7 days storage under damp conditions.

In the case of the application of the same film on the same sheet on a press under 0.2 MPa and at 120° C. The following adherence strengths are obtained:

for the tensile-shear, the strength exceeds 11 MPa.

for the peeling, the strength exceeds 6 daN/cm.

In both cases, after unsticking, there is obtained a profile termed "surface cohesive rupture", which indicates that the rupture occurs within the thickness of the film of adhesive applied and not in the region of the film-sheet interface.

EXAMPLE 2

The purpose of this example is to illustrate the resistance to pressure that can be obtained for tanks made in accordance with the invention.

With a painted and coated sheet according to example 1, a tank of about five liters capacity is made.

To make this tank, the shells are put into shape and assembled according to the invention, the cold mechanical assembling means employed being seaming.

The seal tests carried out show that this tank resists a pressure of about 7 10$^5$ Pa and that the resistance to pressure is limited only by the deformation of the metal shells which form this tank.

This value of the resistance to pressure is distinctly higher than the usual specifications which are generally of the order of 0.4 10$^5$ Pa.

EXAMPLE 3

The purpose of this example is to illustrate the use of the process according to the invention for making a heat exchanger panel 1 such as that shown in FIG. 1.

A strip of steel sheet is continuously coated with a thermobonding polymer coating.

Two sheets 4,5 are cut out in this strip which has been precoated with adhesive.

The size of the sheet 1 is slightly larger than that of the sheet 5 so as to permit subsequently the seaming of the flanges of the sheet 4 onto those of the sheet 5.

The two sheets 4,5 are press-formed in such a manner as to form ribs 2 which are hollow on the coated face.

The two sheets 4,5 are applied against one another, the two coated faces being in contact, so that the ribs of the sheet 4 form with the ribs of the sheet 5 thermal fluid circulation ducts 3.

Figure 4:
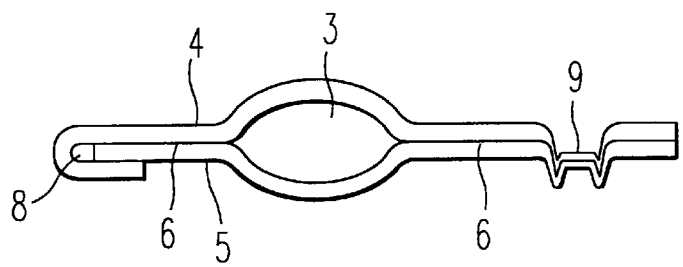
FIG. 4 represents two shell-assembling means employed in the process according to the invention, on one hand, both the seaming on an assembling flange and the clinching in an assembling zone, on the other hand, the adhesive joint in the region of the flange and assembling zone.

The flanges of the sheet 4 are seamed onto those of the sheet 5 as indicated by reference 8 of FIG. 4 and clinchings 9 are formed at predetermined points of the assembling zones of the tank.

The number and the position of the clinchings are predetermined in accordance with the desired resistance to pressure.

While maintaining the two sheets 4,5 pressed against each other, the assembly is heated to activate the bonding between the two polymer coatings in the region where they are in contact, i.e. in the assembling zones.

An adhesive joint 6 which is tight and strong is in this way formed on the whole of the area of the assembling zones.

A heat exchanger panel 1 is in this way obtained.

In respect of ribs having a width of 5 mm, it has been possible, owing to a thermobonding polymer having a rupture energy measured in shear higher than 3 kJ/m$^2$, to ensure a resistance to pressure of the exchanger exceeding 4 10$^6$ Pa.

EXAMPLE 4

The purpose of this example is to illustrate the use of the process according to the invention for making a heat exchanger panel of the same type as that shown in FIG. 1 but having two independent thermal fluid circulation circuits 3A, 3B.

The procedure is as in example 3 except that:
- a strip of sheet steel precoated on both faces is also prepared,
- a sheet 10 of the same size as the sheet 5 is cut out in this strip,
- the sheet 10 is interposed between the sheet 4 and the sheet 5 upon assembly.

Figure 5:
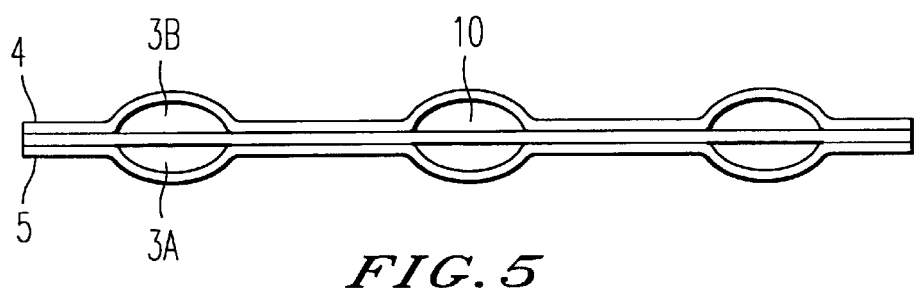
FIG. 5 represents partly in section an evaporator of the same type as that of FIG. 1, but having two independent cooling fluid circuits.

There is then very economically obtained a heat exchanger panel such as that shown in section in FIG. 5 having two independent thermal fluid circulation circuits 3A,3B.

We claim:

1. A process for producing a tank of sheet steel intended to contain a fluid, resisting pressure of a gas, comprising:
   coating a strip of said sheet with a thermobonding polymer based coating adapted to adhere to said sheet and resist corrosion of said fluid,
   then cutting out blanks in said coated strip and producing shells which are shaped in accordance with the shape intended for said tank and include assembling zones, for putting in contact when assembling, said shells being prepared in such a manner that the coated face of said sheet is situated inside said tank,
   then assembling said shells in such a manner as to put them in contact under pressure in the region of said assembling zones, reinforcing the assembly by cold mechanical assembling means applied in the region of said assembling zones, and heating said polymer coatings in contact in the region of said assembling zones to a temperature adapted to activate the bonding and form a fluid-tight bonding joint.

2. The process of claim 1, wherein said cold mechanical assembling means is a seaming.

3. The process of claim 1, wherein said cold mechanical assembling means is clinching.

4. The process of claim 1, wherein said polymer base coating has a thickness of between 20 and 150 micrometers.

5. The process of claim 1, wherein said steel sheet is coated with a coating selected from the group consisting of zinc, aluminium, zinc alloy, aluminium alloy, paint.

6. The process of claim 1, wherein said steel sheet is coated with a coating selected from the group consisting of zinc, aluminium, zinc alloy, aluminium alloy and with a coating of paint.

7. The process of claim 1, said tank being intended to contain an automobile fuel, wherein:
   said polymer of said coating is semi-crystalline thermoplastic,
   said heating of said polymer coatings in contact in the region of said assembling zones is effected at a temperature higher than the melting temperature of said polymer.

8. The process of claim 7, wherein said semi-crystalline thermoplastic polymer is based on polyolefin.

9. The process of claim 8, wherein said polyolefin is polyethylene.

10. The process of claim 8, wherein said polyolefin is polypropylene.

11. The process of claim 7, wherein said semi-crystalline thermoplastic polymer has a crystallinity ratio higher than 60% and a solubility parameter close to that of said fuel.

12. The process of claim 8, wherein said semi-crystalline thermoplastic polymer has a crystallinity ratio higher than 60% and a solubility parameter close to that of said fuel.

13. The process of claim 1, said tank being intended to act as a heat exchanger and contain a cooling or heat-transfer fluid, wherein said shaping of said shells in accordance with the shape intended for said heat exchanger comprises forming ribs adapted to constitute, after assembly, fluid-tight ducts for the circulation of said fluid in said exchanger.

14. A metal fuel tank formed of a plurality of shells of steel sheet assembled in a fluid-tight manner, obtained by a process comprising:
   coating a strip of said sheet with a thermobonding polymer based coating adapted to adhere to said sheet and resist corrosion by said fuel,
   then cutting out blanks in said coated strip and producing shells which have a shape in accordance with the shape intended for said tank and including assembling zones, for putting in contact when assembling, said shells being prepared in such a manner that the coated face of said sheet is situated inside said tank,
   then assembling said shells in such a manner as to put them in contact under pressure in the region of said assembling zones, reinforcing the assembly by cold mechanical assembling means applied in the region of said assembling zones, and heating said polymer coatings in contact in the region of said assembling zones to a temperature adapted to activate the bonding and form a fluid-tight bonding joint,
   said shells being internally coated with a coating of semi-crystalline thermoplastic polymer for protection against internal corrosion, and said polymer coating acting as a fluid-tight adhesive bonding joint between said assembled shells.

15. A tank intended to act as a heat exchanger and contain a cooling or heat-transfer fluid, formed of a plurality of shells of steel sheet assembled in a fluid-tight manner obtained by a process comprising:
   coating a strip of said sheet with a thermobonding polymer based coating adapted to adhere to said sheet and resist corrosion of said fluid,
   then cutting out blanks in said coated strip and producing shells which are shaped in accordance with the shape intended for said heat exchanger tank and include assembling zones, for putting into contact when assembling, said shells being prepared in such a manner that the coated face of the sheet is situated inside said tank,
   then assembling said shells in such a manner as to put them in contact under pressure in the region of said assembling zones, reinforcing the assembly by cold mechanical assembling means applied in the region of said assembling zones, and heating said polymer coatings in contact in the region of said assembling zones to a temperature adapted to activate the bonding and form a fluid-tight bonding joint,
   said shape of said shells in accordance with the shape intended for said heat exchanger comprising ribs which constitute in the assembled shells fluid-tight ducts for the circulation of said fluid in said exchanger.

16. The tank of claim 15, comprising a plurality of independent thermal fluid circulation circuits.

* * * * *

UNITED STATES PATENT AND TRADEMARK OFFICE
CERTIFICATE OF CORRECTION

PATENT NO. : 6,050,330
DATED : April 18, 2000
INVENTOR(S) : Schmit et al.

It is certified that error appears in the above-identified patent and that said Letters Patent is hereby corrected as shown below:

On the title page, delete Item [30] in its entirety and replace with
--[30]  Foreign Application Priority Data
May 24, 1996          [FR]   France ......................96 06439--.

Signed and Sealed this

Twenty-second Day of May, 2001

*Attest:*

NICHOLAS P. GODICI

*Attesting Officer*           Acting Director of the United States Patent and Trademark Office